Aug. 30, 1966     I. A. JOLLY     3,269,782
AIR BRAKE VALVE MODIFIED INPUT
Filed Feb. 15, 1966     2 Sheets-Sheet 1

United States Patent Office 3,269,782
Patented August 30, 1966

3,269,782
AIR BRAKE VALVE MODIFIED INPUT
Ian A. Jolly, Tyseley, Birmingham, England, assignor to Girling Limited
Filed Feb. 15, 1966, Ser. No. 527,464
Claims priority, application Great Britain, Feb. 23, 1965, 7,763/65
7 Claims. (Cl. 303—6)

This invention is concerned with improvements in and relating to brake control means for vehicles.

The braking effort which can be developed at a road wheel of a vehicle before skidding occurs is partly dependent on the wheel loading. In vehicles for carrying passengers or goods, the wheel loading may vary within wide limits and the distribution of the total load between the various wheels may also vary so that it is difficult to provide a braking system which will provide braking approaching the optimum on different wheels under different conditions of loading.

The design of a braking system therefore is usually a compromise, and under some conditions one or more wheels of a vehicle may skid while the brakes on other wheels are not fully loaded. This is particularly the case with goods vehicles where the variation in the wheel loading between empty and laden conditions may be very substantial.

In my United Kingdom Patent No. 917,494 there is described brake control means in which a line from an operator's control to a brake actuator includes a valve biased by a spring in the same sense as it is biased by braking pressure in the line. This valve can be lifted off its seat by a valve actuator which is movable, in a direction to lift the valve, by a member which is fully exposed at all times to whatever pressure appears in the line due to the operator's control and which operates the valve actuator by way of an element movable along a plane inclined relative to the line of travel of the member and of the valve actuator. This plane is angularly adjustable, in accord with variation of vehicle loading automatically as for example by coupling it to the suspension of an axle of the vehicle or manually to positions which correspond to fully laden, half laden and unladen. When the brakes are "off" the valve actuator provides communication between the brake actuator and atmosphere. When the brakes are applied the pressure in the brake line loads the member and thereby, with a modification imposed by the inclined plane, the valve actuator. This moves to lift the valve and seals the brake actuator from atmosphere. At a predetermined pressure in the brake line, the valve will move the valve actuator against the action of the member and the valve will seat with the valve actuator continuing to seal the brake actuator from atmosphere. When the brakes are "off" again the valve actuator will move again away from the valve under the action of the pressure in the brake actuator and will put the brake actuator again in communication with atmosphere.

Such arrangement is satisfactory in certain circumstances but where the loading on a wheel varies with deceleration, there is an ideal relationship between drag and deceleration. This ideal is not a straight line relationship and drag rises less rapidly with rise of deceleration as the load decreases.

It is an object of this invention to provide an improved brake control means particularly for rear wheels where the load on the wheels varies in relation to deceleration.

According to this invention there is provided a brake control means comprising a valve assembly which is controllable by a member actuated by signal pressure and acting through an inclined plane of which the inclination is variable and which assembly is subject to another pressure, normally the pressure of the brake actuators, acting in the opposite sense, the member actuated by signal pressure having a first area exposed to signal pressure for actuation of the member up to a predetermined signal pressure and a second reduced area for actuation of the member above that pressure.

By this arrangement the effect of the member actuated by signal pressure will have a reduced effect after the signal pressure has reached the predetermined value and when used with rear wheels the braking effort by the operator will have a reduced effect, as the weight transfer from the rear to the front wheels increases with increased deceleration.

In order that the present invention may be well understood there will now be described two embodiments thereof, given by way of example only, reference being had to the accompanying drawings in which.

Figure 1:
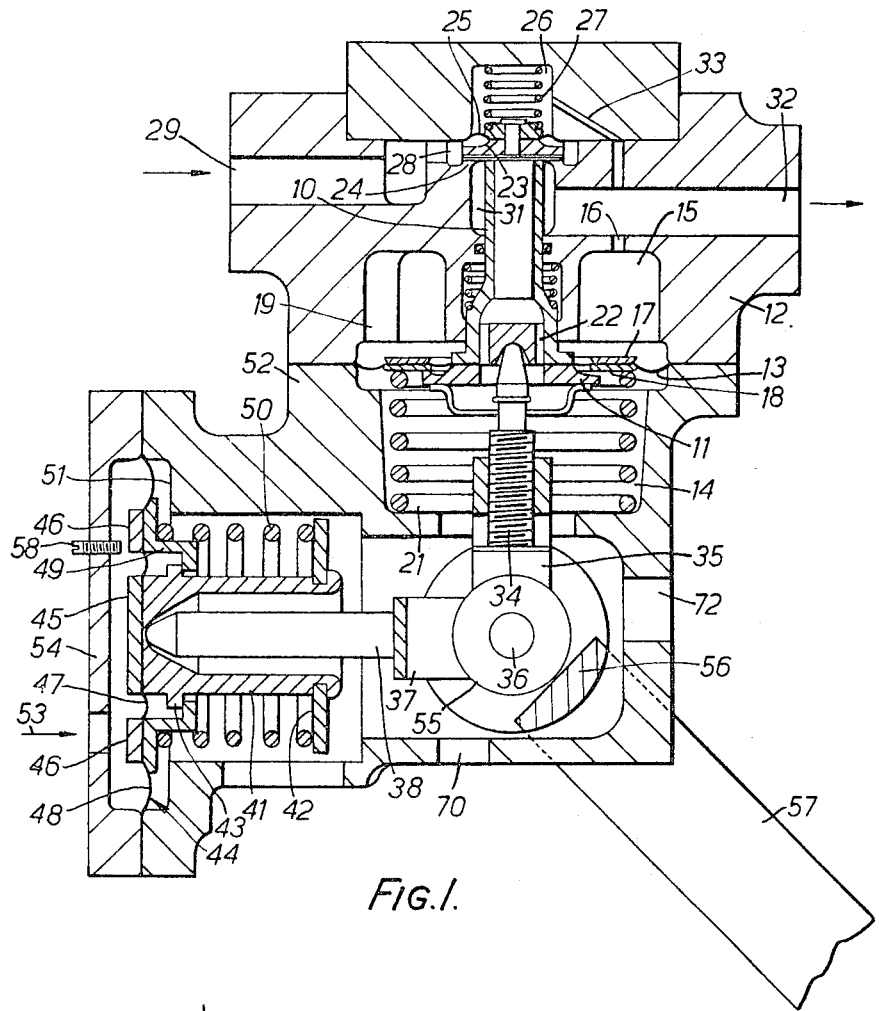
FIGURE 1 is a section through a first embodiment of brake control means.

In the control means shown in FIGURE 1 a hollow valve element has a stem 10 on the lower end of which is a head 11. The stem is slidably mounted in a bore in a body 12. The valve element is associated with pressure-sensitive means in the form of a flexible diaphragm 13 which is secured at its inner edge to the stem 10 and at its outer edge is clamped between two parts of the body. The diaphragm 13 divides the body 12 into a lower chamber 14 which houses the control mechanism and an upper chamber 15 which is annular and is closed except for a port 16 connecting it to the output side of the valve. An annular portion of the diaphragm 13 is clamped between two metal rings 17, 18 forming abutment means and the portion of the diaphragm between the rings and the stem of the valve element permits a limited relative axial movement between the valve element and the rings 17, 18. The outer portion of the diaphragm permits limited movement of the rings 17, 18 relative to the body 12. Upward movement of the diaphragm is limited by the engagement of the upper ring 17 with a stop in the form of three internal shoulders 19 in the body (only one is visible on FIGURE 1) and downward movement of the diaphragm relative to the valve element is limited by the engagement of the lower ring 18 with another stop in the form of the head 11 of the valve element. Resilient means in the form of a spring 21 bear on the lower ring 18 to bias the diaphragm upwardly.

The hollow stem 10 of the valve element communicates through axial ports 22 in the head 11 with the chamber 14 and from there with atmosphere through openings 70 and 72 in that chamber. The upper end of the stem 10 co-operates with a washered valve head 23 normally held in engagement with an annular seating 24 in the body concentric with the stem which is reduced in diameter adjacent to its upper end. The valve head is supported by a diaphragm 25 closing the lower end of a small chamber 26 above the valve head, a light spring 27 in this chamber urging the valve head downwardly into engagement with the seating 24. An annular space 28 between the diaphragm 25 and the seating 24 is in communication with an inlet passage 29 to which fluid under pressure is supplied from a source such as a reservoir or accumulator.

An annular space 31 around the valve stem 10 below the seating 24 is in communication with an outlet passage 32 leading to the slave cylinders of the brakes to be actuated. The passage 32 is in communication through the port 16 with the chamber 15 as described above and through a port 33 with the small chamber 26 above the valve head. Thus the upper surfaces of the diaphragm 13 and 25 are both exposed to the outlet pressure when the brake is applied.

In the "brakes off" position the valve head 23 is in engagement with its seating 24 and the upper end of the stem 10 of the valve element is spaced from the underside of the valve head. The supply or inlet pressure acts upwardly on the underside of the upper diaphragm 25 and downwardly on the upper side of the valve head 23, and the respective areas are such that there is a slight resultant downward force to hold the valve head in engagement with its seating. The brake line is open to atmosphere through the stem 10, the chamber 14 and the openings 70 and 72.

The biasing spring 21 exerts an upward force on the diaphragm 13 which is taken by the engagement of the upper ring 17 on the diaphragm with the shoulder 19 in the body.

Control of the valve element is effected by a movable finger 34 adjustably screwed into a fork or yoke 35 pivotally mounted on a floating spindle 36 located in the lower end of the body, the upper end of the finger being in rocking engagement with an axial recess in the lower end of the valve element. A fork or yoke 37 also pivotally mounted on the spindle 36 carries a finger 38.

The finger 38 is engaged by the interior of a hollow thrust member 41 having inner and outer flanges 42, 43. At its outer end thrust member 41 is coupled to a diaphragm 44 by a plate 45 the diaphragm further carrying an outer ring 46 which divides the diaphragm into radially inner and radially outer parts 47, 48. On the inner surface of the diaphragm and coupled to the ring 46 is an internally flanged ring 49 engaging inside the thrust member outer flange 43. A compression spring 50 seats against the flanged ring 49 and the thrust member inner flange 42 so that the flanged ring is held against the thrust member outer flange 43. As will be seen inward movement of the flanged ring 49 is limited by a shoulder 51 on the body 52. An inlet 53 conveys to the space between a cover plate 54 and the diaphragm fluid at a signal pressure determined by a pedal-operated valve or other means under the control of the driver of the vehicle. A roller 55 mounted on the spindle 36 is in rolling engagement with an inclined plane surface 56 which is angularly movable about the axis of the spindle by a lever arm 57 coupled to a part of an axle suspension or other part sensitive to the axle loading.

An adjustable stop 58 may be screwed through the cover plate 54 to limit the movement of the ring 46 towards the cover plate.

The effective leverage ratio between the force applied to the diaphragm by the incoming controlled fluid pressure and the force applied to the valve element depends on the inclination of the plane surface 56 which in turn depends on the vehicle loading.

In an alternative construction, the angle of the surface 56 is adjustable manually for example between an "unladen" position, a "half-laden" position and a "fully-laden" position.

When a signal pressure is applied to the diaphragm 44 it exerts an upward force through the finger 34 on the valve element, the leverage through which the applied pressure acts being dependent on the inclination of the plane surface 56. The valve element is moved upwardly until the upper end of the stem 10 engages the valve head 25 and cuts off from atmosphere the outlet passage and the chambers 26 and 15. On an increase in the signal pressure the valve element is raised to lift the valve head 25 off its seating and allow pressure fluid to flow to the outlet 32 and so to the brakes. At the same time the pressure applied to the brakes is admitted to the chamber 26 where its acts downwardly on the diaphragm 25 and to the chamber 15 where it acts downwardly on the diaphragm 13 which moves downwardly against the spring 21 until the lower ring 18 engages the head 11 of the valve element. Further increase in pressure acting over the whole diaphragm and exerting a downward force on the valve element in opposition to the upward force exerted by the signal pressure moves the valve element downwardly to allow the head 23 to close onto its seating to prevent further flow of fluid to the brakes.

The signal air pressure, acts over both parts of the diaphragm and the flanged ring 49, which compresses spring 50, as the signal pressure increases. The internal flange of the ring 49 which separates from the outer external flange 43 of the thrust member, continuing to move until the flanged ring 49 engages the stop 51, when the outer part 48 of the diaphragm becomes ineffective and the input force to the valve is then due only to the pressure acting over the inner part 47 of the diaphragm and the end of the thrust member.

Thus at signal air pressure below a certain predetermined value, determined by the strength of spring 50 and the areas of the diaphragm parts 47, 48, the operation of the valve depends upon the displacement of the outer part of the diaphragm.

Above that predetermined signal pressure there is a decrease in the area over which the signal pressure is effective and there is a corresponding decrease in the output from the valve.

Figure 2:
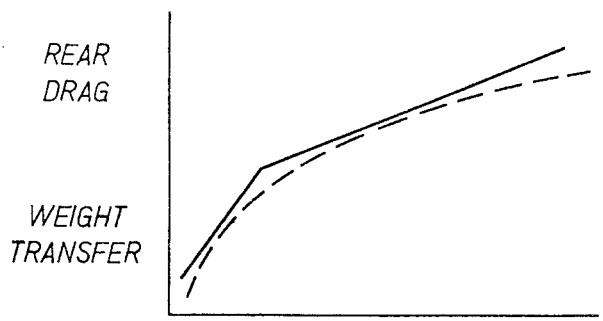
FIGURE 2 is a diagrammatic indication of the relationship of rear drag to deceleration.

This means that the relationship between the drag at the rear wheel of the vehicle (i.e. the wheels at which the load variation is taken into account to modify the angle of the inclined plane) and the deceleration is roughly as shown in straight lines in FIGURE 2; it approaches fairly closely to the curve (shown dotted) which represents an ideal relationship between the drag and the deceleration dictated by the effect of weight transfer (i.e. the change in loading of the wheel when braking occurs).

Figure 3:
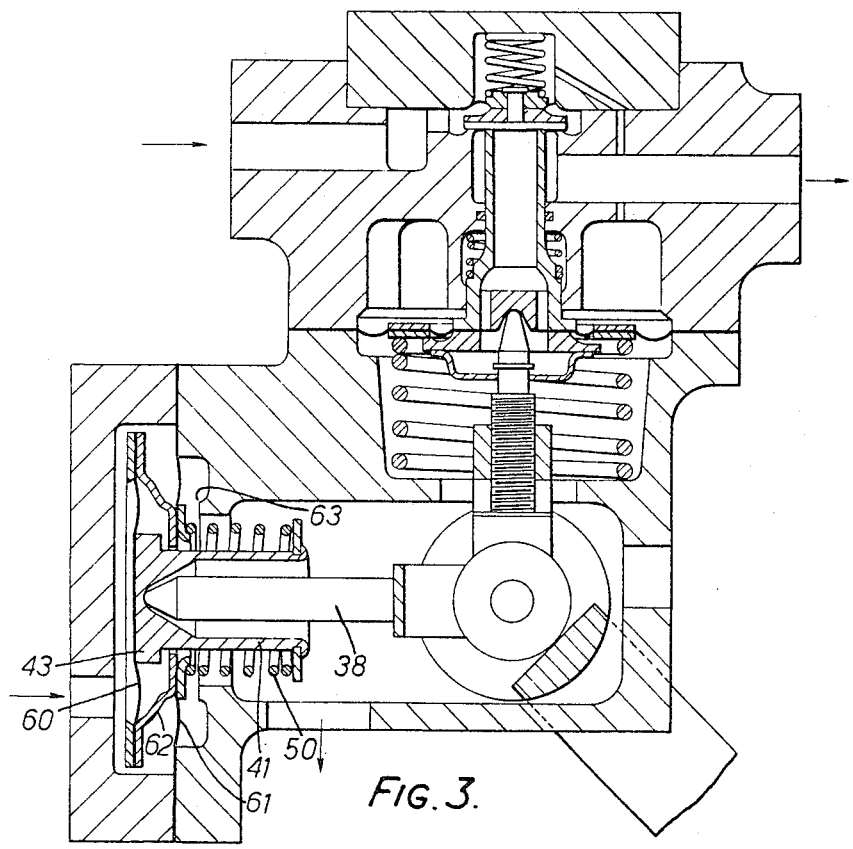
FIGURE 3 is a cross section of a second embodiment of brake control.

FIGURE 3 shows the same construction but for the form of the diaphragm subject to signal pressure. In this embodiment that diaphragm comprises a part 60 axially offset from a part 61 by a clamping ring 62. The finger 38 again engages member 41 whose flange 43 is normally spaced from the clamping ring which is itself spaced from stop 63 which is the equivalent of stop 51.

In operation the signal pressure bears on both the diaphragm parts 60 and 61 and compresses spring 80, until clamping ring reaches stop 63. Thereafter only the axially outermost part 60 of the diaphragm is effective to drive the thrust member to take up the spacing between the flange 43 and the clamping ring.

This embodiment again provides for a rear wheel the drag to deceleration relationship approaching the ideal.

Figure 4:
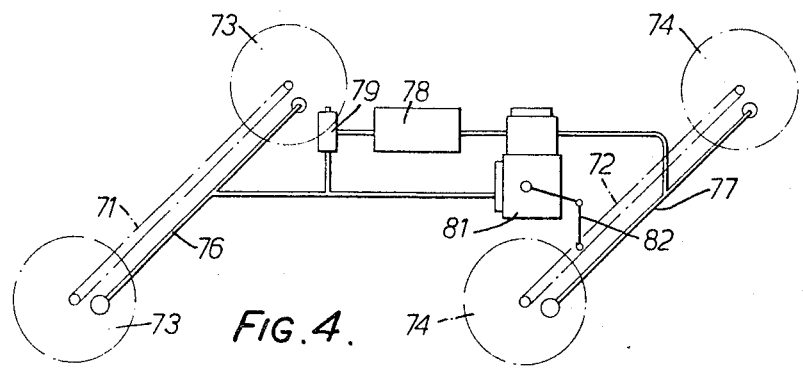
FIGURE 4 is a diagrammatic layout of a brake control system incorporating either of the control means of FIGURES 1 and 3.

Referring to FIGURE 4 an example of a brake control system is shown in which 71 and 72 are front and rear axles of a vehicle carrying wheels 73 and 74 provided with fluid pressure brakes to which fluid under pressure is supplied through pipe lines 76 and 77.

The system incorporates a reservoir 78 containing fluid under pressure, a pedal-operated valve 79 and at least one control means 71 as described above with reference to FIGURE 1 or FIGURE 3.

Fluid under pressure is supplied directly from the valve 79 to the pipe line 76 leading to the brakes of the wheels on the axle 73.

Fluid under pressure is supplied to the pipe line 77 leading to the brakes of the wheels on the axle 72 through the control means 71, the pressure supplied to the brakes being determined by the signal pressure provided by the valve 79 and the inclination of the inclined plane in the control means which is coupled to the axle by a link 82.

The reservoir or accumulator providing the input pressure can be located close to the brakes while the signal pressure is obtained from the same reservoir or accumulator through a line of any required length under the control of a treadle valve.

I claim:
1. A brake control means comprising a valve assembly which is controllable by a member actuated by signal pressure and acting through an inclined plane of which the inclination is variable and which assembly is subject to another pressure, normally the pressure of the brake actuators, acting in the opposite sense, the member actuated by signal pressure having a first area exposed to signal pressure for actuation of the member up to a predetermined signal pressure and a second reduced area for actuation of the member above that pressure.

2. A brake control system according to claim 1 in which the valve assembly comprises a first valve for a line from an operator's control to a brake actuator, and a second valve subject to the pressure on the brake actuator side of the first valve acting in one sense and to the member acting in the opposite sense, the second valve being normally open to relieve pressure in the region on the brake actuator side of the first valve and closable by the member before that member opens the first valve.

3. A brake control system according to claim 1 in which the member actuated by signal pressure is movable by a diaphragm which engages the member which bears on the inclined plane, the first area of the diaphragm being movable to displace the member over a predetermined travel and the second part being movable to continue displacement of the member after said predetermined travel.

4. A brake control system according to claim 3 in which the diaphragm at a central region bears on the member and at an outer zone on an element which bears on the member through a spring a stop being provided in the path of the element.

5. A brake control system according to claim 3 in which a first diaphragm bears on the member and has its outer periphery coupled to the movable inner periphery of a second annular diaphragm by an axially and radially inwardly extending ring, a stop in the path of the ring limiting the travel thereof, and the ring bearing on the member through a spring.

6. A brake control means for controlling fluid pressure in a line from an operator's control to a wheel brake actuator, the control means including a valve engageable with a main valve seat to control the line, a second valve movable relative to the main valve to sequentially seal the line from the main valve to the brake actuator from exhaust to atmosphere and to lift the main valve from its seat, a device responsive to upstream pressure between the main valve and brake actuator and operative to sequentially move the second valve in a direction to allow the main valve to seat, and to exhaust pressure upstream of the main valve, a bell crank movable at its apex on an inclined surface inclined relative to the path of the main valve and second valve said inclination being variable, and having one arm engaged by the second valve, a first diaphrgam bearing on the second arm of the bell crank and a member movable relative thereto and a second diaphragm bearing on the movable member, a stop being provided in the path of the movable member to limit travel thereof, the bell crank second arm being movable by the member up to engagement thereof with said stop and by the first diaphragm area only thereafter, the first part being of less area than the second and first parts together.

7. A brake control means according to claim 1 in a vehicle and having the valve assembly in the line from an operator's control to a pair of rear wheel brake actuators, the signal pressure actuated member being exposed to fluid whose pressure is controlled in accordance with the pressure between said operator's control and valve assembly the inclined plane being actuated by a link whose position varies with the variations of the chassis and the axle of the rear wheels associated with said actuators.

No references cited.

EUGENE G. BOTZ, *Primary Examiner.*